(12) United States Patent
Park et al.

(10) Patent No.: US 9,571,264 B2
(45) Date of Patent: Feb. 14, 2017

(54) COMMUNICATION SYSTEM INCLUDING MULTIPLE RECEIVING ANTENNAS AND TIME TRACKING METHOD THEREOF

(71) Applicant: Samsung Electronics Co., Ltd., Suwon-si (KR)

(72) Inventors: Chang Soon Park, Chungju-si (KR); Young Jun Hong, Seoul (KR); Joon Seong Kang, Suwon-si (KR); Jong Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 14/105,682

(22) Filed: Dec. 13, 2013

(65) Prior Publication Data

US 2014/0169513 A1 Jun. 19, 2014

(30) Foreign Application Priority Data

Dec. 13, 2012 (KR) .......................... 10-2012-0145535

(51) Int. Cl.
*H04L 7/00* (2006.01)
*H04B 7/08* (2006.01)

(52) U.S. Cl.
CPC ............. *H04L 7/007* (2013.01); *H04B 7/0837* (2013.01)

(58) Field of Classification Search
CPC ................................ H04L 7/0016; H04L 7/007

USPC .................................. 375/144, 148, 316, 347
See application file for complete search history.

(56) References Cited

U.S. PATENT DOCUMENTS

| | | | |
|---|---|---|---|
| 2002/0041624 A1* | 4/2002 | Kim et al. | ..................... 375/148 |
| 2005/0113142 A1* | 5/2005 | Felter | ......................... 455/562.1 |
| 2009/0129511 A1 | 5/2009 | Vijayan et al. | |
| 2011/0070833 A1 | 3/2011 | Perkins et al. | |
| 2012/0183018 A1* | 7/2012 | Yellin | ............................. 375/144 |

FOREIGN PATENT DOCUMENTS

| | | |
|---|---|---|
| KR | 10-2005-0063590 A | 6/2005 |
| KR | 10-2006-0066029 A | 6/2006 |
| KR | 10-0817015 B1 | 3/2008 |
| KR | 10-2009-0018218 A | 2/2009 |
| KR | 10-2009-0083385 A | 8/2009 |
| KR | 10-2010-0014195 A | 2/2010 |
| KR | 10-2010-0014196 A | 2/2010 |
| KR | 10-2010-0130659 A | 12/2010 |

* cited by examiner

*Primary Examiner* — Freshteh N Aghdam
(74) *Attorney, Agent, or Firm* — NSIP Law

(57) ABSTRACT

A tracking method and apparatus of a communication system to prevent a timing difference and bit error rate performance degradation caused by unstable characteristics of a plurality of circuit devices are provided. The tracking method and apparatus include sampling signals received at receiving antennas, tracking sample values resulting from the sampling of the signals, and combining the tracked sample values.

22 Claims, 14 Drawing Sheets

COMMUNICATION SYSTEM INCLUDING MULTIPLE RECEIVING ANTENNAS AND TIME TRACKING METHOD THEREOF

CROSS-REFERENCE TO RELATED APPLICATION(S)

This application claims the benefit under 35 U.S.C. §119 (a) of Korean Patent Application No. 10-2012-0145535, filed on Dec. 13, 2012, in the Korean Intellectual Property Office, the entire disclosure of which is incorporated herein by reference for all purposes.

BACKGROUND

1. Field

The following description relates to a communication system including receiving antennas and a time tracking method thereof.

2. Description of Related Art

Wireless sensor network is gaining popularity with the rapid growth and commercialization of a wireless network technology. Also, wireless technology standards for exchanging data in wireless sensor networks are defined by the Institute of Electrical and Electronics Engineers (IEEE), for example, Bluetooth®, IEEE standard 802.15.4 (2011), ZigBee®, and other similar standards.

A wireless sensor device has a wide range of applications including home security, medical field, mobile healthcare, chemical and biological abnormality monitoring, machine abnormality and breakdown diagnosis, environment monitoring, disaster-related information sensing, intelligent transportation management, real-time security, and remote surveillance.

Sensors in wireless sensor networks and near field communication sensors need to be small in size, and require low power and low complexity to be able to operate a large number of sensors for an extended period of time.

Specially, strict requirements of low complexity and low power exist for a wireless body area network (WBAN) in which wireless communication is established between a sensor installed in a body and a nearby mobile device or another sensor installed in another body.

To attain low complexity and low power, there is a need to introduce an ultra-low power radio frequency (RF) structure rather than a conventional high power RF structure; however, an ultra-low power analog circuit, which is normally used in WBAN, degrades performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a tracking method, including sampling signals received at antennas; tracking sample values resulting from the sampling of the signals; and combining the tracked sample values.

The tracking may include individually tracking the sample values resulting from the sampling of the signals received at the antennas.

The tracking may include storing the sample values in buffers corresponding to the antennas, calculating metrics based on the sample values stored in the buffers, comparing the metrics and outputting a result indicative thereof, and compensating for a sampling time error of the sample values based on the result.

The calculating of the metrics may include calculating the metrics using an arithmetic average of a preset number of latest sample values stored in the buffers.

The calculating of the metrics may include calculating the metrics at a respective position of a symbol period corresponding to the antennas.

The compensating of the sampling time error of the sample values may include individually compensating for the sampling time error of the antennas.

The compensating of the sampling time error of the sample values may include compensating for the sampling time error by adjusting time indices of the sample values based on the result.

The compensating of the sampling time error of the sample values may include in response to the result of a first sample value, corresponding to an antenna of the antennas, sampled at a first position, and being a reference of a first symbol period, and a third sample value, which is sampled immediately after the first symbol period, being less than a second sample value, which is immediately sampled prior to the first symbol period, compensating for the sampling time error of the sample values by compensating for the time indices by inserting a sample value in a second symbol period after the first symbol period.

The compensating of the sampling time error of the sample values may include in response to the result of a first sample value, corresponding to an antenna of the antennas, sampled at a first position, and being a reference of a first symbol period, and a second sample value, which is sampled immediately prior to the first symbol period, being less than a third sample value, which is immediately sampled after the first symbol period, compensating for the sampling time error of the sample values by compensating for the time indices by eliminating a sample value from a second symbol period after the first symbol period.

The storing of the sample values may include adjusting a sample window direction to control a shift direction of the time indices of the sample values based on the result, and storing, in the buffers, sample values corresponding to a compensated position based on the adjusted sample window direction.

The adjusting of the sample window direction may include adjusting the sample window direction by controlling a shift direction of time indices for sample values of the second symbol period with respect to the first sample value sampled at the first position, as a reference of the first symbol period, among the sample values stored in the buffers.

In accordance with an illustrative configuration, a tracking method, including sampling signals received at antennas; mapping sample values resulting from the sampling of the signals to timing positions; combining the sample values mapped to the timing positions; tracking the combined sample values; and combining the tracked sample values.

The mapping may include mapping position indices corresponding to the timing positions of the sample values; and joint mapping of the mapping of the position indices and the timing positions.

The combining of the sample values may include combining the sample values mapped to the joint mapped timing positions.

The method may also include storing the combined sample values in buffers corresponding to the receiving antennas, calculating metrics based on the sample values stored in the buffers, comparing the metrics and outputting a result indicative thereof, and compensating for a sampling time error of the sample values based on the result.

The calculating of the metrics may include calculating the metrics using an arithmetic average of a preset number of latest sample values stored in the buffers.

The compensating of the sampling time error of the sample values may include compensating for time indices of the sample values based on the result.

The compensating of the sampling time error of the sample values may include in response to the result of a first sample value, corresponding to an antenna of the antennas, sampled at a first position, and being a reference of a first symbol period, and a third sample value, which is sampled immediately after the first symbol period, being less than a second sample value, which is immediately sampled prior to the first symbol period, compensating for the sampling time error of the sample values by compensating for the time indices by inserting a sample value in a second symbol period after the first symbol period.

The mapping of the position indices may include adjusting a sample window direction to control a shift direction of the time indices of the sample values based on the result; and mapping, to the sample values resulting from the sampling, the position indices corresponding to timing positions of sample values corresponding to a compensated position based on the adjusted sample window direction.

The adjusting of the sample window direction may include adjusting the sample window direction by controlling a shift direction of time indices for sample values of the second symbol period with respect to the first sample value sampled at the first position as a reference of the first symbol period, among the sample values.

The compensating of the sampling time error of the sample values may include in response to the result of a first sample value, corresponding to an antenna of the antennas, sampled at a first position, and being a reference of a first symbol period, and a second sample value, which is sampled immediately prior to the first symbol period, being less than a third sample value, which is immediately sampled after the first symbol period, compensating for the sampling time error of the sample values by compensating for the time indices by eliminating a sample value from a second symbol period after the first symbol period.

The mapping of the position indices may include adjusting a sample window direction to control a shift direction of the time indices of the sample values based on the result; and mapping, to the sample values resulting from the sampling, the position indices corresponding to timing positions of sample values corresponding to a compensated position based on the adjusted sample window direction.

The adjusting of the sample window direction may include adjusting the sample window direction by controlling a shift direction of time indices for sample values of the second symbol period with respect to the first sample value sampled at the first position as a reference of the first symbol period, among the sample values.

In accordance with an illustrative example, there is provided a non-transitory computer-readable medium comprising a program for instructing a computer to perform the method of sampling signals received at antennas, tracking sample values resulting from the sampling of the signals, and combining the tracked sample values.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
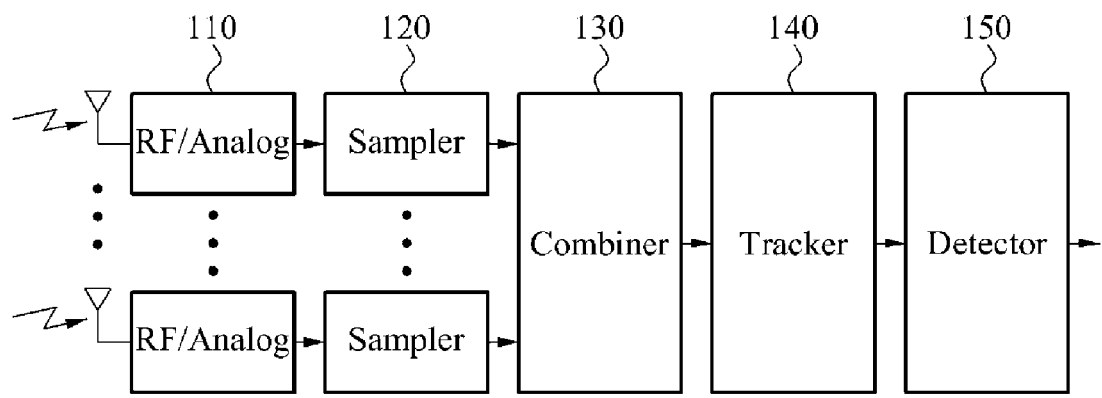
FIG. 1 is a block diagram illustrating a communication system including multiple receiving antennas.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a block diagram illustrating a communication system including multiple receiving antennas.

Referring to FIG. 1, the communication system including multiple receiving antennas includes radio frequency (RF)/analog circuits 110, samplers 120, a combiner 130, a tracker 140, and a detector 150.

The communication system combines signals received from multiple receiving antennas, and performs a tracking signal processing of the combined received signals to adjust a received timing.

The signals passing through the RF/analog circuits 110 are digitalized through the samplers 120. Also, the digitalized signals output from the samplers 120 are fed to the combiner 130 as input signals. In this instance, a combining method performed by the combiner 130 is adaptively performed to an arbitrary structure of a corresponding communication system. The input signals combined at the combiner 130 may include a signal-to-noise ratio (SNR) gain and a diversity gain to improve reception performance.

Also, to compensate for a timing error between a transmitter and a receiver, the tracker 140 performs a tracking signal processing, such as a time tracking signal processing of the signals combined at the combiner 130 in a sequential order. Subsequently, the detector 150 detects data from the tracking signal processed combined signals.

In this example, basic synchronization between a transmitter and a receiver may be assumed to be completed. Once synchronization is completed, the signals combined at the combiner 130 are transmitted to the detector 150 without tracking. Also, as time goes by, the tracker 140 may perform tracking to compensate for a timing error of the combined signals by monitoring the timing error that may occur between the transmitter and the receiver.

In this instance, when a time response characteristic along an RF chain is slow or fast all over the multiple receiving antennas, data detection performance may not be degraded even though the tracking signal processing is performed on the signals combined at the combiner 130 in a sequential order.

However, a time response characteristic of the RF/analog circuits 110 between the multiple receiving antennas is not necessarily the same. When tracking signal processing is performed on the signals combined at the combiner 130, a sampling time difference may occur between the received signals. Also, the combined signals may not reflect this sampling time difference.

For example, a sample value sampled at a higher sampling rate than a transmitting signal may be obtained by increasing an operating speed of a frequency-related circuit or other circuits in an antenna. In contrast, a sample value sampled at a lower sampling rate than the transmitting signal may be obtained in other antennas. Accordingly, when sample values of each receiving antenna are combined and tracked in a sequential order, without considering a sampling time difference, a timing characteristic difference between antennas may not be reflected and, as a result, data detection performance may be degraded.

An ultra-low power system such as a wireless body area network (WBAN) may be known as having a propagation distance of approximately three meters or less. However, when a transmitter and a receiver are located in a wide indoor space or different rooms within the same building, a transmitting/receiving distance may be increased to approximately ten meters.

In particular, a medical device may require an increased transmission/reception range to communicate under an emergent situation, and significant data may need good reliability in transmission and reception. To expand the range and improve the reliability in transmission and reception, a receive diversity technology may be used. In one example, the receive diversity technology corresponds to a technology that aims to obtain an SNR gain by receiving data from at least one antenna installed at a receiving end and a diversity gain by combining different wireless channels. To install multiple receiving antennas in an ultra-low power system, problems associated with security and increased complexity between the multiple receiving antennas at a predetermined interval may be raised. For these reasons, a receive diversity technology is efficient in a mobile terminal, which is smaller in size and has less complexity than a sensor node.

However, when signals are received using multiple receiving antennas, a detrimental timing difference may occur due to a plurality of different characteristics between the antennas in an actual system. Before transmitting and receiving meaningful data between a transmitter and a receiver, the communication system performs a synchronization signal processing to determine a point in time at which data is received correctly. In other words, to set proper synchronization, a predefined pattern of predetermined signals are transmitted and received.

However, although initial synchronization is set correctly, a slight difference may occur in subsequent data transmission and reception time. This may be caused by a slight frequency difference in an RF oscillator of the transmitter and the receiver, and in particular, a slight difference in frequency of clocks that may run in baseband signal processing. Additionally, a slight difference in data transmission and reception time may occur due to a slight difference in response time characteristics of circuits in a transmitter and a receiver among various RF devices, an analog part, and a digital part.

These differences may affect data transmission and reception subsequent to synchronization, resulting in degradation of bit error rate performance. The receiver may adjust a reception time along a time axis for a correct reception time, which may refer to time tracking or tracking.

However, a conventional ultra-low power system may suffer from deterioration of imperfect timing even after synchronization is completed because various circuit devices, including an RF device, may have a more imperfect characteristic. In particular, when signals are received through multiple receiving antennas, a timing difference between the antennas may increase because different RFs and analog circuits may be applied to different antennas.

Accordingly, in an embodiment, reception performance of a communication system is improved by resolving a timing difference caused by different characteristics between antennas when sampling a received signal in a low power system.

Figure 2:
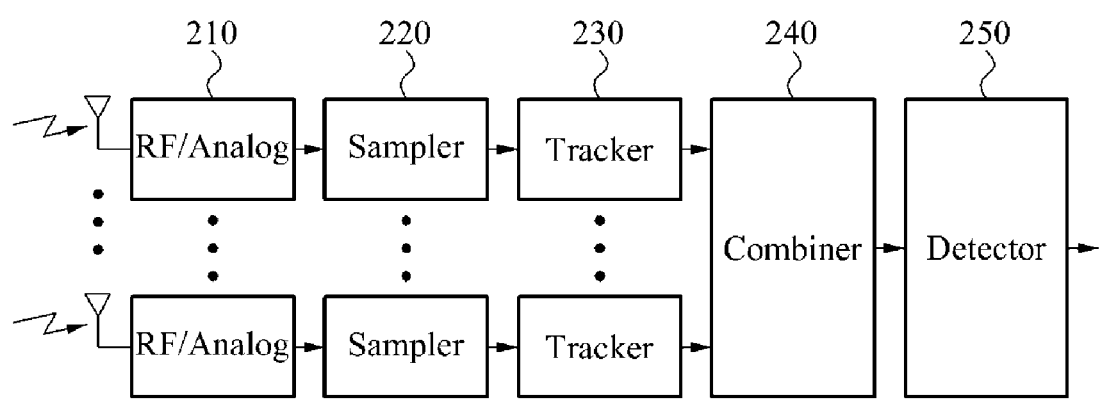
FIG. 2 is a block diagram illustrating a communication system including multiple receiving antennas to perform a pre-combining independent path tracking method, according to an embodiment.

FIG. 2 is a block diagram illustrating a communication system including multiple receiving antennas to perform a pre-combining independent path tracking method, according to an embodiment.

Referring to FIG. 2, the communication system includes multiple receiving antennas to perform a pre-combining independent path tracking method, according to an embodiment, includes RF/analog circuits 210, samplers 220, trackers 230, a combiner 240, and a detector 250.

The RF/analog circuits 210 receive signals from multiple receiving antennas.

The samplers 220 sample the signals received from the multiple receiving antennas through the RF/analog circuits 210. In one example, the samplers 220 sample the signals received from the corresponding receiving antennas. In one illustrative example, the sampler 220 corresponds to an analog-to-digital converter (ADC), and sample values resulting from sampling the signals may correspond to ADC sample values output from an ADC.

The trackers 230 perform tracking on the sample values to compensate for a timing error. That is, the trackers 230 compensate for a timing error of the sample values sampled by corresponding samplers 220.

The combiner 240 may combine the ADC sample values tracked by the trackers 230.

The detector 250 detects data from the combined ADC sample values.

The pre-combining independent path tracking method, according to an embodiment, performs an independent tracking signal processing for each receiving antenna or each signal path, and combines the processed tracking signals. Accordingly, a sampling time difference due to different characteristics of each receiving antenna may be prevented. In a scenario including multiple receiving antennas in which a sampling rate of a first receiving antenna is lower than an ideal or target sampling rate and a sampling rate of a second receiving antenna is higher than the ideal sampling rate, these non-ideal sampling rates are independently compensated and combined for each antenna. In this example, sample values from the receiving antennas are combined after the timing characteristic difference between the antennas is compensated to prevent data detection performance from degrading.

As described in the foregoing, the communication system to perform the pre-combining independent path tracking method may operate in two schemes of a bi-directional sample window and a unidirectional sample window.

The communication system operating in a bi-directional sample window scheme is described with reference to FIG. 5, and the communication system operating in a unidirectional sample window scheme is described with reference to FIG. 10.

A process for signal processing in the communication system including multiple receiving antennas is described in detail with reference to FIGS. 3 and 4.

Figure 3:
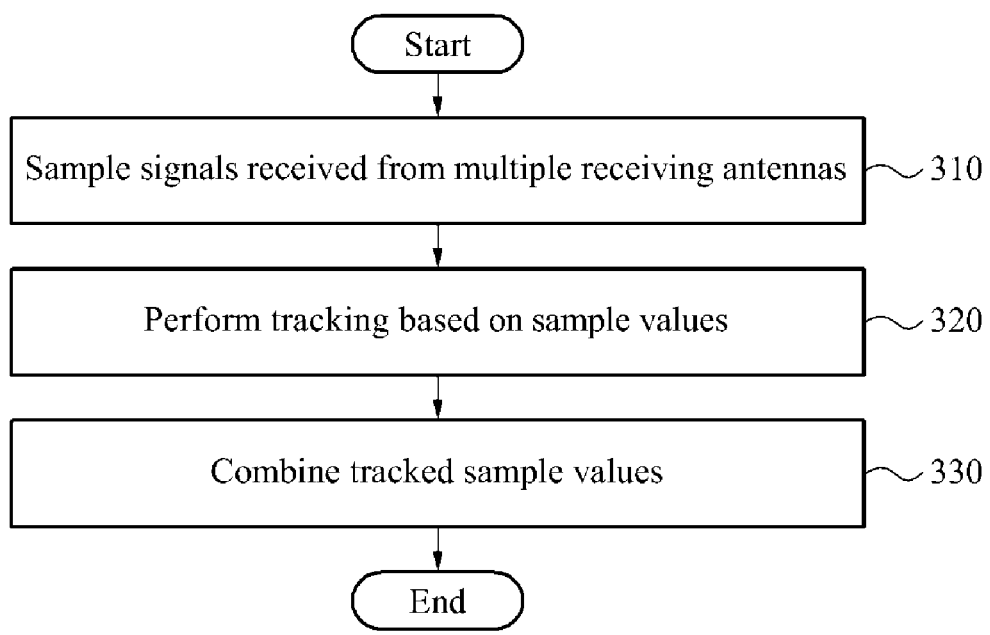
FIG. 3 is a flowchart illustrating a pre-combining independent path tracking method of the communication system including the multiple receiving antennas, according to an embodiment.

FIG. 3 is a flowchart illustrating a pre-combining independent path tracking method of the communication system including the multiple receiving antennas, according to an embodiment.

Referring to FIG. 3, in 310, the method samples signals received from the multiple receiving antennas. In one example, the method samples the signals received from the multiple receiving antennas using, for example, an ADC.

In 320, the method performs tracking on sample values, for example, ADC sample values, to compensate for a timing error. In one example, the method performs tracking on the sample values individually for each of the multiple receiving antennas. It is to be appreciated that other alternatives on tracking the sample values may be done such as tracking the sample value of those receiving antennas from the multiple receiving antennas that are within or outside a predetermined range, or tracking the sample value of predetermined receiving antennas. The tracking operation of the communication system is described in detail with reference to FIG. 4.

In 330, the method combines the tracked sample values.

Figure 4:
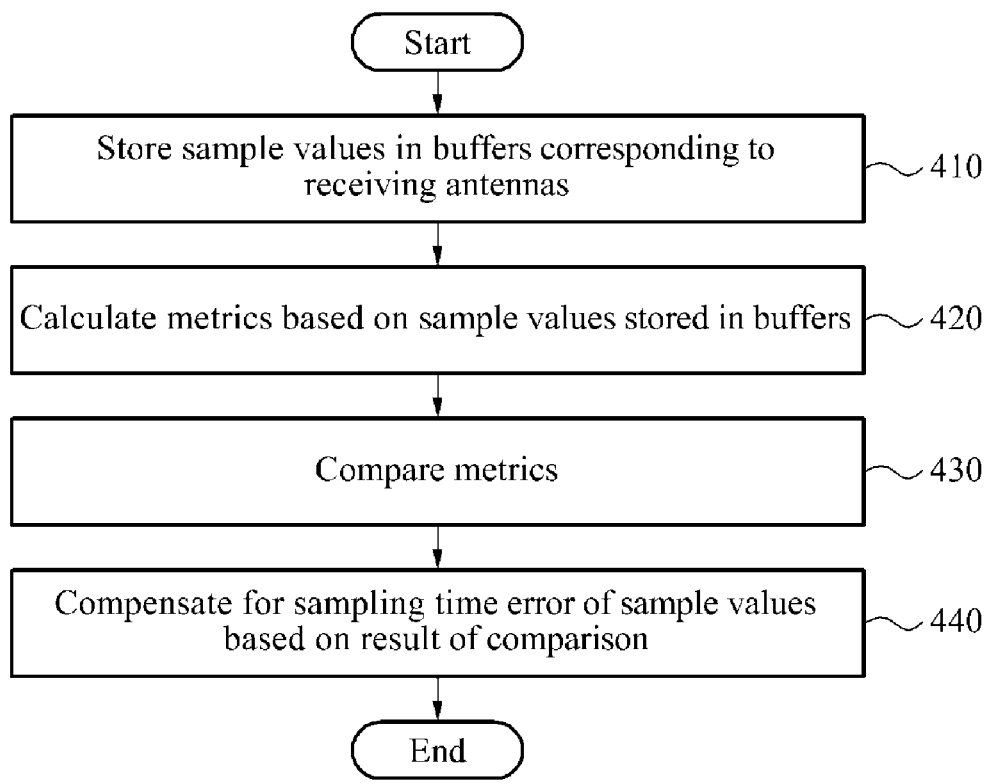
FIG. 4 is a flowchart illustrating a tracking operation performed in FIG. 3.

FIG. 4 is a flowchart illustrating a tracking operation performed in FIG. 3.

Referring to FIG. 4, in 410, the method stores the sample values in buffers corresponding to the receiving antennas. In one example, the method stores in the buffers the sample values corresponding to multiple symbol periods of each of the multiple receiving antennas. In one alternative example, the method stores in the buffers the sample values associated with a predetermined number of receiving antennas. The predetermined number of receiving antennas may be selected based on proximity or other predefined condition.

Also, the method of the communication system stores, in different buffers, a sample value corresponding to a correct receive timing position previously determined and sample values located in both directions from the sample value. The method stores in the buffers the sample values corresponding to the multiple symbol periods.

In 420, the method calculates metrics based on the sample values stored in the buffers. In one example, the method calculates the metrics using an arithmetic average of a preset number of latest sample values stored in each of the buffers.

In one example, the method calculates an arithmetic average of sample values corresponding to time indices of received symbols belonging to $S_j$ among the sample values, when calculating each metric. $S_j$ corresponds to a collection of time indices of symbols available in time tracking having different values for different positions among N latest transmitting symbols.

Also, the method may calculate the metrics at each position in the symbol periods of the receiving antennas. In one example, the symbol period of the receiving antenna is a sampling period of a received symbol of the receiving antenna.

In 430, the method compares the metrics individually for each of the receiving antennas.

In 440, the method compensates for a sampling time error of the sample values based on a result of the comparison in 430. In this instance, the method compensates for the sampling time error independently for each of the multiple receiving antennas. In one example, the method simultaneously and independently compensates for each of the multiple receiving antennas or independently compensates each of the multiple receiving antennas one at a time.

Also, the method compensates the sampling time error in the receiving antennas by adjusting the time indices for the sample values based on the result of the comparison in 430.

A method to compensate for the sampling time error of the sample values in the communication system is described in detail with reference to FIGS. 6 through 9.

Figure 5:
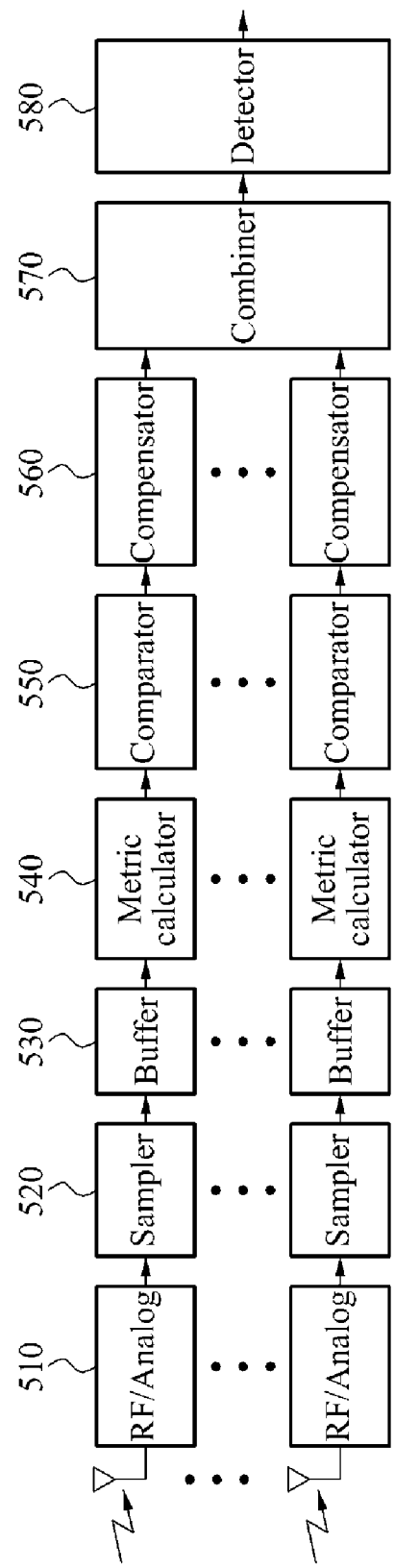
FIG. 5 is a block diagram illustrating the communication system including the multiple receiving antennas to perform a pre-combining independent path tracking method, according to another embodiment.

FIG. 5 is a block diagram illustrating the communication system including the multiple receiving antennas to perform a pre-combining independent path tracking method, according to another embodiment.

Referring to FIG. 5, the communication system according to another exemplary embodiment may include RF/analog circuits 510, samplers 520, buffers 530, metric calculators 540, comparators 550, compensators 560, a combiner 570, and a detector 580. In one example, the number of the RF/analog circuits 510, the samplers 520, the buffers 530, the metric calculators 540, the comparators 550, and the compensators 560 may be configured to correspond to the number of multiple receiving antennas.

The RF/analog circuits 510 receive signals from the corresponding receiving antennas.

The samplers 520 sample the signals received from the corresponding receiving antennas through the RF/analog circuits 510. In one example, the samplers 520 correspond to an ADC, and sample values resulting from sampling correspond to an ADC sample value or ADC sample values.

The number of buffers 530 is configured to correspond to the number of receiving antennas, and may store sample values. In an example, the sample values are ADC sample values corresponding to receiving antennas among the multiple receiving antennas. In one example, an ADC sample value corresponding to a correct receive timing position and ADC sample values located in both directions from the correct receive timing position previously determined are stored in buffers corresponding to different timing positions.

In an example, different timing positions are timing positions determined to be at a center of a symbol period and positions shifted slightly back and forth from the timing position.

Initially, a center position may be determined to be a timing position through synchronization. After synchronization, the timing position may be shifted slightly back and forth due to a plurality of imperfect characteristics. Accordingly, tracking may be performed.

A center position value in a symbol period may have a greatest value in the presence of some noise; however, when an amount of noise is high, the position value may have a relatively low value. As a result, using only one value in one symbol period may be insufficient.

Accordingly, in an embodiment, values determined to be at a center in a symbol period may be used to calculate an average together with values determined to be at a center in a plurality of previous symbols.

That is, storing sample values in buffers corresponding to different timing positions may be described through the following example.

In ten symbol periods, sample values determined to be currently at a center may be used to calculate an average, and the average may be stored in a buffer 1. Also, in the ten symbol periods, sample values determined to be located slightly left of the center may be used to calculate an average, and such average may be stored in a buffer 2. Further, in the ten symbol periods, sample values determined to be located slightly right of the center may be used to calculate an average, and the average may be stored in a buffer 3.

The buffers 530 store ADC sample values corresponding to multiple symbol periods.

The metric calculators 540 calculate metrics based on the sample values stored in the buffers 530. The metric calculators 540 calculate the metrics using a calculation method for each of the ADC sample values in the buffers 530 corresponding to the different timing positions of the ADC sample values. A method of calculating the metrics is described with reference to FIG. 6 below.

The comparators 550 compare the metrics.

The compensators 560 compensate for a sampling time error of the sample values based on a result of the comparison by the comparators 550.

The combiner 570 combined the tracked ADC sample values.

The detector 580 detects data from the combined ADC sample values.

Figure 6:
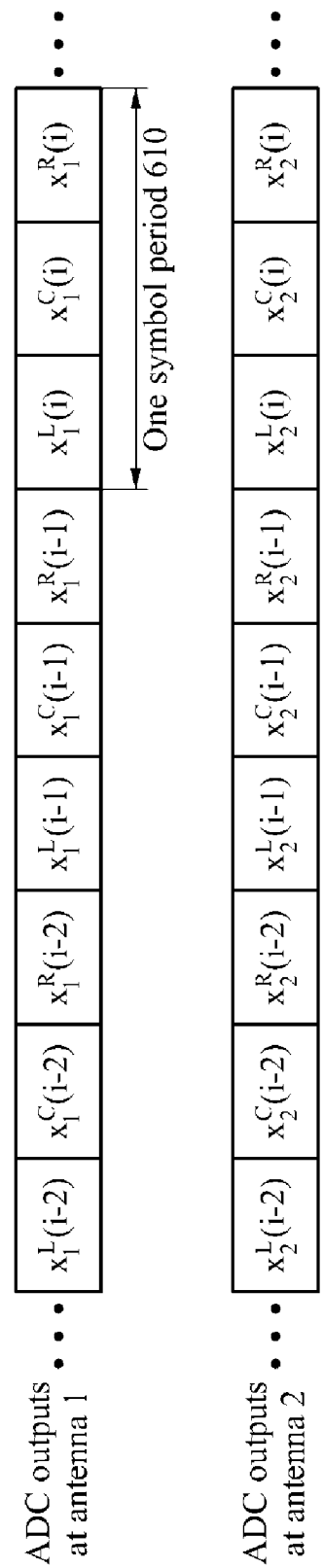
FIG. 6 is a diagram illustrating sample values corresponding to the multiple receiving antennas of the communication system, according to an embodiment.

FIG. 6 is a diagram illustrating sample values corresponding to the multiple receiving antennas of the communication system, according to an embodiment. Referring to FIG. 6, a method of calculating a metric based on the sample values at the multiple receiving antennas is described.

The communication system, according to an embodiment, calculates a metric using an arithmetic average of an arbitrary number of latest ADC sample values stored in each buffer.

For example, when two receiving antennas are present, an ADC sample value is received at each receiving antenna, and three oversampling is performed per symbol, where $x_k^L(i)$, $x_k^C(i)$, $x_k^R(i)$ correspond to ADC output values or ADC sampling values at a left position, a center position, and a right position of an i-th received symbol of a k-th receiving antenna, respectively.

An ADC sampling value at $x_k^C(i)$ may correspond to a sample value determined to be at a correct receive timing position corresponding to a center position of a symbol period 610 or a sampling period when synchronization is completed.

$x_k^L(i)$ may correspond to a sample value sampled immediately before $x_k^C(i)$, and $x_k^R(i)$ may correspond to a sample value sampled immediately after $x_k^C(i)$.

Metrics may be calculated differently based on the receiving antenna and a position in a sampling period of each receiving antenna, as shown in, for example, Equation 1 below.

$$\Lambda_k^L(j) = \frac{1}{N} \sum_{i: i \in S_j, |S_j|=N} x_k^L(i),$$

$$\Lambda_k^C(j) = \frac{1}{N} \sum_{i: i \in S_j, |S_j|=N} x_k^C(i),$$

$$\Lambda_k^R(j) = \frac{1}{N} \sum_{i: i \in S_j, |S_j|=N} x_k^R(i)$$

[Equation 1]

In one example, $\Lambda_k^L(j)$, $\Lambda_k^C(j)$, $\Lambda_k^R(j)$ correspond to metrics at a left position, a center position, and a right position of a j-th received symbol of a k-th receiving antenna.

In each metric, an arithmetic average of time indices of ADC sample values belonging to $S_j$ among ADC sample values may be calculated. $S_j$ corresponds to a collection of time indices of symbols available in time tracking, the time indices of symbols due to having different values for different positions among N latest transmitting symbols. In the above equation, $|S_j|=N$ represents N as a number of elements of $S_j$ where N denotes a natural number.

Subsequently, the communication system adjusts the time index for the ADC sample value by comparing the metrics independently for each receiving antenna, to compensate for a sampling time error in each receiving antenna.

For example, when a center position of a symbol period or a sampling period is at a correct receiving position but, based on latest sample values, a metric value at a right position immediately after the center position is greater, a subsequent correct receive timing position, that is, a reference position in a symbol period, may be adjusted to the right position immediately after than the center position.

Compensation of a sampling time error may be performed independently for each receiving antenna, and subsequently, ADC sample values in each antenna may be combined collectively. The sampling time error may also be performed simultaneously or sequentially for each receiving antenna.

A process to compensate a sampling time error is described in detail through more intuitive examples with reference to FIGS. 7 through 9 below.

Figure 7:
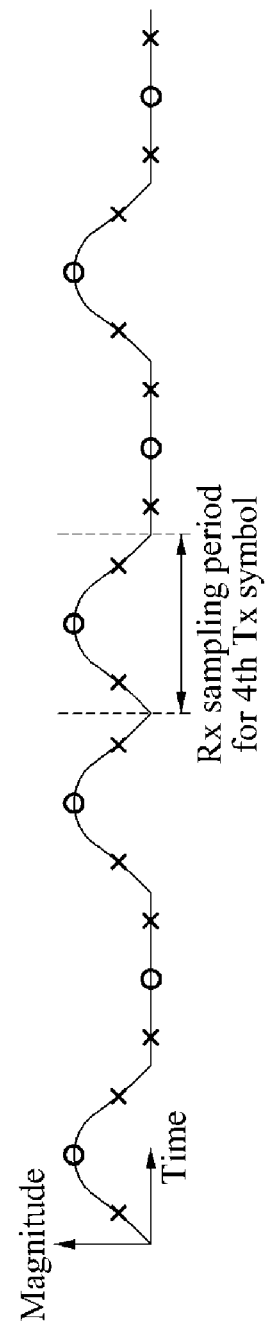
FIG. 7 is a diagram illustrating sample values when a received signal is sampled without a timing error in a receiving antenna among the multiple receiving antennas of the communication system, according to an embodiment.

FIG. 7 is a diagram illustrating sample values when a received signal is sampled without a timing error in a receiving antenna among the multiple receiving antennas of the communication system, according to an embodiment.

For example, in a case in which noise at a receiving end is ignored, when a transmitting bit is one as shown in FIG. 7, a baseband (analog) received signal may show a Gaussian pulse shape. When a transmitting bit is zero, the baseband (analog) a received signal may be zero.

In one example, a center (timing) position indicated in a circle represents a correct receive timing position in a sampling period for a received symbol.

In this instance, when a transmitting bit is transmitted by "1011010" in a temporal order, the baseband (analog) received signal at a receiving end and an ADC sample value resulting from sampling of the baseband (analog) received signal may be as shown in FIG. 7. FIG. 7 illustrates a case in which three oversamplings are performed per transmitting signal and sampling is performed ideally without a timing error while ignoring noise at a receiving end.

Figure 8:
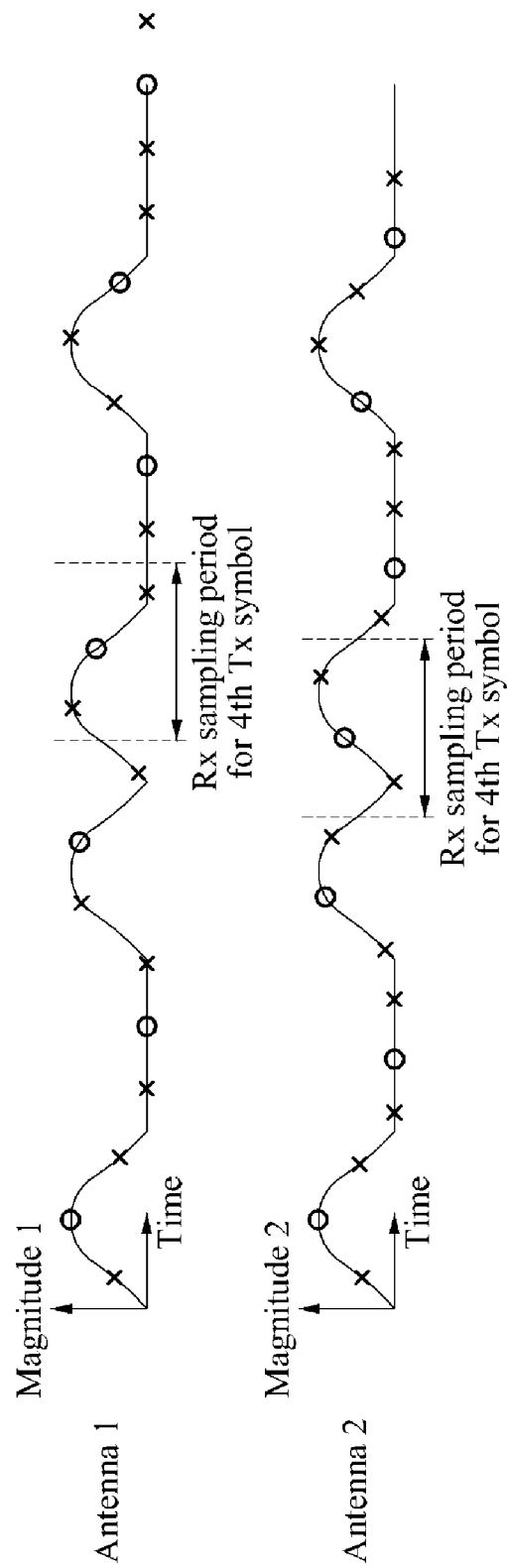
FIG. 8 is a diagram illustrating received signals and sample values when a sampling time difference occurs due to a characteristics difference between receiving antennas among the multiple receiving antennas of the communication system, according to an embodiment.

FIG. 8 is a diagram illustrating received signals and sample values when a sampling time difference occurs due to a characteristics difference between receiving antennas among the multiple receiving antennas of the communication system, according to an embodiment.

Referring to FIG. 8, in a case of signals received from two receiving antennas, an antenna 1 may obtain an ADC sample value sampled slower than a transmitting signal using a slower operation of a frequency-related circuit or other circuits.

When initial synchronization is complete, a center (timing) position indicated in a circle as shown in FIG. 7 may be determined to be a correct receiving position of a sampling period for a received symbol.

However, FIG. 8 shows that a center position indicated in a circle moves slowly to the right at an antenna 1 and moves slowly to the left at an antenna 2.

In this instance, a slow rightward shift of a center position indicated in a circle represent sample values slowly sampled at the antenna 1.

Accordingly, in an embodiment, when tracking sample values corresponding to the antenna 1, time compensation is performed for the ADC sample values sampled at a low sampling rate by duplicating an arbitrary ADC sample value and inserting the duplicated ADC sample value in the center of a sampling period.

Also, a slow leftward shift of a center position indicated in a circle may represent that sample values are being sampled quickly at the antenna 2.

Accordingly, in an embodiment, when tracking sample values corresponding to the antenna 2, time compensation is performed for the ADC sample values sampled at a high sampling rate by eliminating an arbitrary value from the ADC sample values corresponding to the antenna 2. A compensation method in each case may be referred to FIG. 9.

Figure 9:
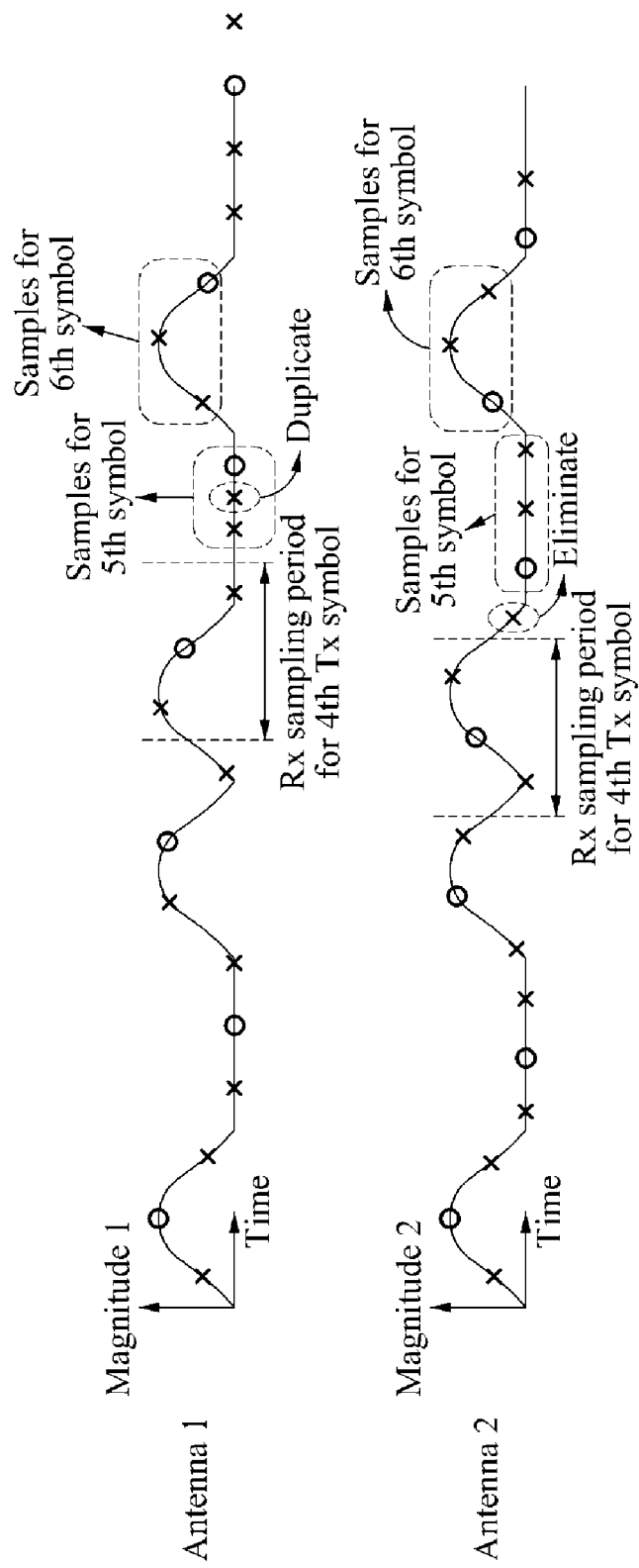
FIG. 9 is a diagram illustrating a method to compensate for the sampling time difference of FIG. 8 for each antenna in accordance with a tracking method of the communication system, according to an embodiment.

FIG. 9 is a diagram illustrating a method to compensate for the sampling time difference of FIG. 8 for each antenna in accordance with a tracking method of the communication system, according to an embodiment.

In a case of N=1, in accord with the foregoing method, metric calculation is described with reference to FIG. 9.

For example, a first sample value is sampled at a center position or a first position of a sampling period for a fourth received symbol. A third sample value is sampled at a right position and a third position corresponding to a position immediately after the first sample value. When the first sample value and the third sample value are less than a second sample value sampled at a left position or a second position corresponding to a position immediately before the first sample value, a number of samples decreases during a predetermined period of time due to sampling of sample values being at a low sampling rate. Accordingly, in this case, a ADC sample value, for example, '0', may be artificially duplicated. The duplicate may be inserted in a sampling period for a fifth symbol after a sampling period for a fourth received symbol.

In contrast, a first sample value is sampled at a center position or a first position of a sampling period for a fourth received symbol. A second sample value is sampled at a left position and a second position corresponding to a position immediately before the first sample value. When the first sample value and the second sample value are less than a third sample value sampled at a right position or a third position corresponding to a position immediately after the first sample value, a number of samples increases during a predetermined period of time due to sampling sample values being at a very high sampling rate. Accordingly, an ADC sample value, for example, an ADC sample value appearing first in a sampling period for a fifth symbol may be artificially eliminated.

Also, when a sample value at a center position is greatest, there is no need for a timing change to compensate for a sampling time error.

However, in the above method, at least three buffers may be set to compare metrics at a reference timing position previously determined, that is, a preset reference timing position, for example, a center position, in a sampling period for a previous received symbol, and timing positions located in both directions from the reference timing position.

In particular, when comparing metrics, metrics using a smaller number of sample values may be influenced by received noise of a random property.

Accordingly, in an embodiment, use of a smaller number of sample values may reduce the influence of received noise of a random property. To illustrate such configuration, a block diagram of a communication system to implement a pre-combining independent path tracking method based on an adaptive unidirectional sample window scheme is described with respect to FIG. 10.

Figure 10:
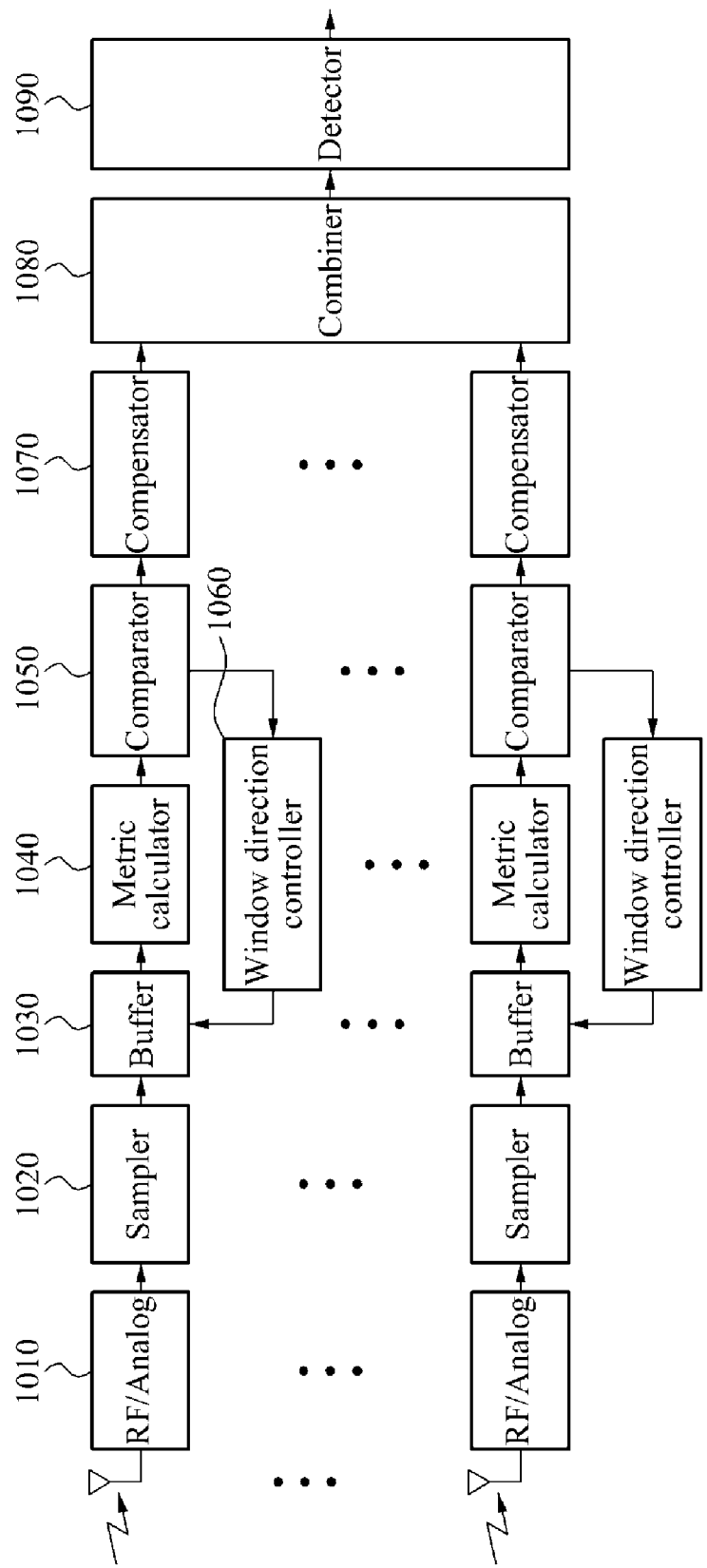
FIG. 10 is a block diagram illustrating the communication system including the multiple receiving antennas to perform a pre-combining independent path tracking method, according to still another embodiment.

FIG. 10 is a block diagram illustrating the communication system including the multiple receiving antennas to perform a pre-combining independent path tracking method, according to still another embodiment.

Referring to FIG. 10, the communication system according to another embodiment includes RF/analog circuits 1010, samplers 1020, buffers 1030, metric calculators 1040, comparators 1050, window direction controllers 1060, compensators 1070, a combiner 1080, and a detector 1090.

In one example, the RF/analog circuits 1010, the samplers 1020, the buffers 1030, the metric calculators 1040, the comparators 1050, the window direction controllers 1060, and the compensators 1070 are configured to correspond to the number of multiple receiving antennas. Also, the RF/analog circuits 1010, the samplers 1020, the buffers 1030, the metric calculators 1040, the comparators 1050, the window direction controllers 1060, and the compensators 1070 have similar configurations as those of corresponding elements or components described with respect to FIG. 5, and a reference may be made to the corresponding disclosure.

Hereinafter, a structure and an operation of the communication system is described based on a structure and an operation of the window direction controllers 1060.

Based on a result of a comparison performed at the comparators 1050, the window direction controllers 1060 adjusts a sample window direction to control a shift direction of time indices for sample values that are stored in the buffers 1030. Also, the window direction controllers 1060 may re-store sample values corresponding to the adjusted sample window direction in the buffers 1030.

In one illustrative configuration, the communication system of FIG. 10 shares a great portion of a basic structure with the communication system of FIG. 5. However, when compared to the communication system of FIG. 5, the communication system of FIG. 10 may have buffers with smaller memory size and may further include the window direction controllers 1060 to adjust a shift direction of time indices for sample values stored in buffers.

In the communication system of FIG. 10, the buffers 1030 store ADC sample values corresponding to a reference (timing) position previously determined, for example, a center position or a reference point. However, in one example, the buffers 1030 store sample values located in one direction from a reference timing position rather than sample values located in both directions.

Also, the window direction controllers 1060 perform direction setting with regard to a reference point. In one example, initial direction settings are set in accord with a system environment of the communication system.

The window direction controllers 1060 may use various methods for direction setting. As an illustrative example, the following method may be used.

The window direction controllers 1060 may set a movement direction of a sample window based on a direction determined as a result of timing tracking previously performed and a timing position currently determined.

For example, when a sample window direction is set to a left direction from a reference (timing) position, the communication system compares metrics at the reference (timing) position during current tracking and a left position of the reference (timing) position. When a left position of the reference (timing) position is determined to be a better or correct receiving position than the reference (timing) position through current tracking, the window direction controllers 1060 determine the left position of the updated reference position to be a timing position to be used next time. This is based on assumption that when a timing error occurs in a direction, a probability of a timing error occurring in a same direction will be greater than the probability of the timing error occurring in an opposite direction at a subsequent time. This assumption may be exceptional in a case in which a characteristic of a circuit related to a receiving antenna changes very fast or changes randomly.

As a result of tracking, when the same reference timing position is determined to be as the previous timing position, the window direction controllers 1060 set a sample window direction to be a right direction, as opposed to the previous direction. This sample window direction may include a right direction not being compared at a next comparison because a current reference position shows at least dominance over a position of a left direction being compared when comparing metrics.

In response to a timing position, which is located at a right direction from a reference (timing) position, is previously determined to be a sample window direction and a right position is determined during current tracking, the window direction controllers 1060 set a sample window direction to a right direction. Also, in a case in which a reference timing position is currently determined to a left direction, the window direction controllers 1060 set a sample window direction to a left direction.

As described in the foregoing, an example of signal processing to adjust a sample window direction is represented in Table 1 below. In this example, a center position represents a timing position for reference, that is, a reference (timing) position. Also, a left position represents a position prior to the center position, and a right position represents a position after the center position.

TABLE 1

| Sample window direction previously determined | Timing position currently determined | Sample window direction currently determined |
|---|---|---|
| Left | Left position | Left |
|  | Center position | Right |
| Right | Right position | Right |
|  | Center position | Left |

As described in the foregoing, Table 1 represents an example to adjust a sample window direction in a pre-combining independent path tracking method based on an adaptive unidirectional sample window scheme.

According to embodiments, another method to adjust a sample window includes changing a sample window direction conditionally based on a result value difference rather than changing a sample window direction to an opposite direction unconditionally when a timing position determined currently is a center position.

For example, when a sample window direction is previously at a left direction and a timing position currently determined is at a center position, the same timing position as the timing position previously determined, a communication system according to an exemplary embodiment subtracts a metric value at a left position from a metric value at a center position. Also, in a case in which a corresponding value, that is, a value obtained by subtracting a metric value, which is at a left position, from a metric value, which is at a center position, is currently increased when compared to the previous metric value, the sample window direction may be changed to an opposite direction. In contrast, in a case in which the corresponding value is currently reduced when compared to the previous one, the sample window direction may not be changed.

Also, for example, in response to a current ADC sample value being relatively slightly greater than the previous ADC sample value when comparing an ADC sample value at a center position to an ADC sample value at a left position, even though both the previous value and the current value are great, it may be advantageous to compare the ADC sample value to a sample value at a right direction from a reference position in a next time. However, when there is a downhill trend, comparing the ADC sample value to a sample value at a left direction may be proper.

Accordingly, in a case in which a timing error occurs in the same direction as before, a time compensation for directionality of the timing error by maintaining a window direction may be considered. Also, in a case in which a timing error does not occur, a sample window direction may be changed when a metric difference value is increasing. As described in the foregoing, in an embodiment, an unnecessary direction change may be prevented by changing a sample window direction in response to a probability of occurrence of a timing error in an opposite direction increasing.

Using the above-mentioned metric mathematical expression, this may be represented by Table 2 below.

TABLE 2

| Sample window direction previously determined | Timing position currently determined currently | Sample window direction currently determined |
|---|---|---|
| Left | Left position | Left |
| | Center position $\Lambda_k^C(j) - \Lambda_k^L(j) < \Lambda_k^C(j-1) - \Lambda_k^L(j-1)$ | |
| | $\Lambda_k^C(j) - \Lambda_k^L(j) \geq \Lambda_k^C(j-1) - \Lambda_k^L(j-1)$ | Right |
| Right | Left position | Right |
| | Center position $\Lambda_k^C(j) - \Lambda_k^R(j) < \Lambda_k^C(j-1) - \Lambda_k^R(j-1)$ | |
| | $\Lambda_k^C(j) - \Lambda_k^R(j) \geq \Lambda_k^C(j-1) - \Lambda_k^R(j-1)$ | Left |

Table 2 shows another example of adjusting a sample window direction in a pre-combining independent path tracking method based on an adaptive unidirectional sample window scheme, according to an embodiment.

Figure 11:
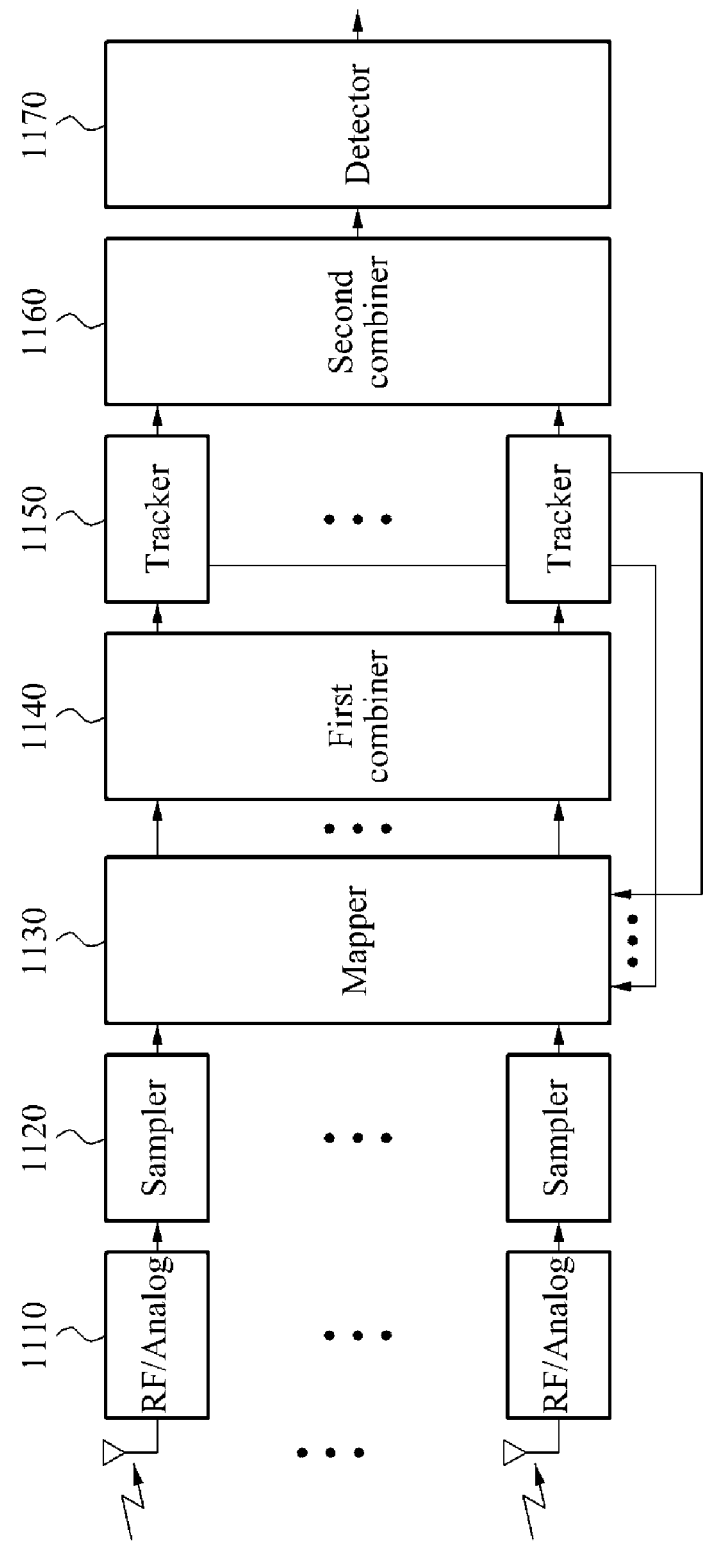
FIG. 11 is a block diagram illustrating the communication system including the multiple receiving antennas to perform a joint path diversity tracking method, according to an embodiment.

However, in response to a diversity gain being difficult to obtain through multiple receiving antennas as a result of performing independent tracking for each antenna in a tracking signal processing, in an embodiment, a tracking apparatus and process to obtain a diversity gain when tracking through a communication system to perform a joint path diversity tracking method is described in FIG. 11.

Hereinafter, a communication system to perform a joint path diversity tracking method according to an embodiment is described.

FIG. 11 is a block diagram illustrating the communication system including the multiple receiving antennas to perform a joint path diversity tracking method, according to an embodiment.

Referring to FIG. 11, a communication system to perform a joint path diversity tracking method, according to an embodiment, includes RF/analog circuits 1110, samplers 1120, a mapper 1130, a first combiner 1140, trackers 1150, a second combiner 1160, and a detector 1170.

In an illustrative example, the communication system performs a joint path diversity tracking method considering all combinable timing cases for each of the antennas, combining these cases, and performing different tracking for each antenna based on multiple pieces of combining information.

Subsequently, the communication system performs the joint path diversity tracking method to combine output signals as a result of applying different tracking for each antenna, and use the combined result to detect data.

The RF/analog circuits 1110 receives signals from multiple receiving antennas.

The samplers 1120 sample the signals received from the receiving antennas through the RF/analog circuits 1110. In this example, the samplers 1120 correspond to ADCs, and sample values resulting from sampling correspond to ADC sample values output from a corresponding ADC.

The mapper 1130 maps sample values sampled by the samplers 1120 to timing positions combinable at the multiple receiving antennas.

The first combiner 1140 combines sample values mapped to the combinable timing positions.

The trackers 1150 performs tracking to compensate for a timing error corresponding to the multiple antennas, based on the sample values combined at the first combiner 1140.

The second combiner 1160 combines the sample values tracked at the trackers 1150.

The detector 1170 detects data from the sample values combined at the second combiner 1160.

A description of differences between the communication system performing the joint path diversity tracking method of FIG. 11 and the communication system performing the pre-combining independent path tracking method of FIG. 2 is provided below.

The communication system performing the pre-combining independent path tracking method of FIG. 2 may perform independent tracking, for each antenna, on signals prior to combining the sample values, whereas the communication system performing the joint path diversity tracking method of FIG. 11 may combine a plurality of timing cases combinable at all receiving antennas and then perform tracking.

The communication system performing the joint path diversity tracking method of FIG. 11 may also reflect a characteristics difference between antennas by applying different tracking to each antenna. However, dissimilar to the communication system performing the pre-combining independent path tracking method of FIG. 2, the communication system performing the joint path diversity tracking method of FIG. 11 may reflect a diversity gain during tracking due to tracking being performed after combining information corresponding to timing positions that may differ for each antenna.

Accordingly, even in a case in which a signal quality is degraded due to a bad channel state of a certain antenna, the quality degradation may be compensated for at another antenna to improve tracking performance.

Figure 12:
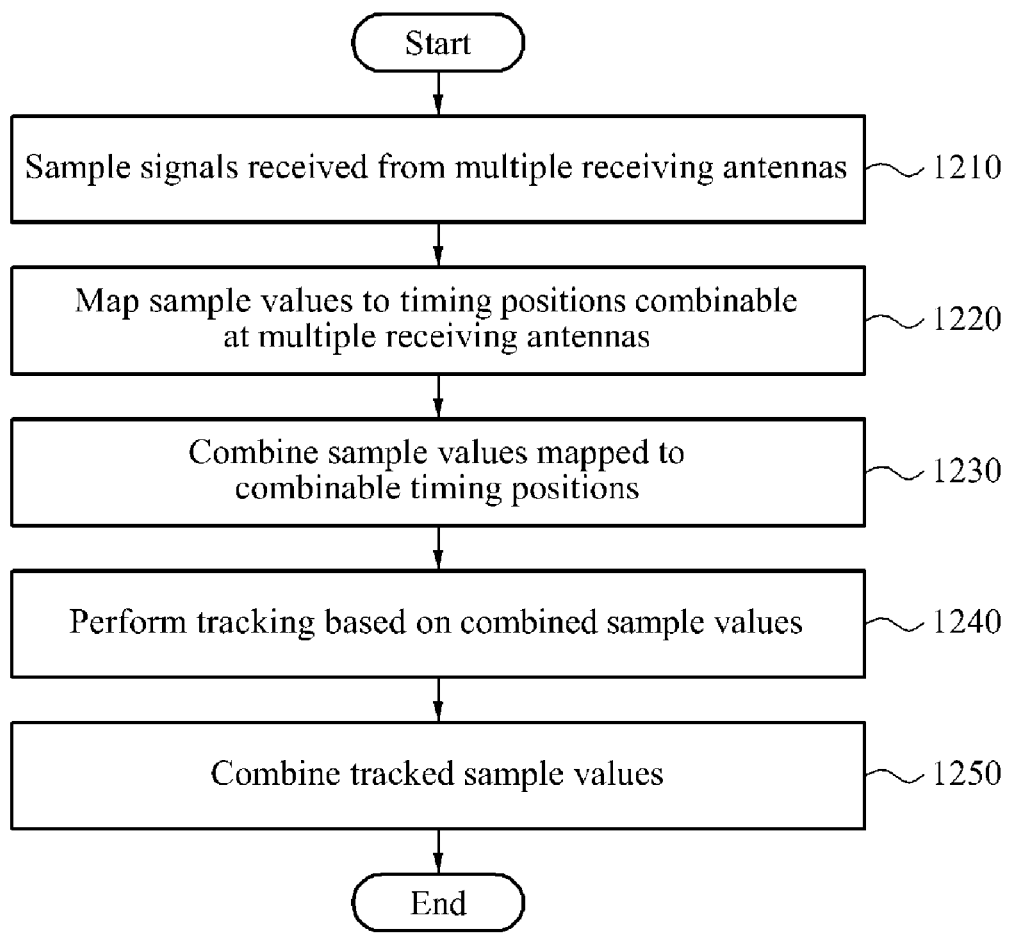
FIG. 12 is a flowchart illustrating a joint path diversity tracking method of the communication system including the multiple receiving antennas, according to an embodiment.

FIG. 12 is a flowchart illustrating a joint path diversity tracking method of the communication system including the multiple receiving antennas, according to an embodiment.

Referring to FIG. 12, at operation 1210, the joint path diversity tracking method samples signals received from multiple receiving antennas.

At operation 1220, the joint path diversity tracking method maps sample values sampled in operation 1210 to timing positions combinable at the multiple receiving antennas. The joint path diversity tracking method maps corresponding indices to timing positions of the sample values, and performs joint mapping of the indices mapping result to timing positions combinable at the multiple receiving antennas.

In one example, joint mapping corresponds to, after mapping corresponding indices to timing positions for each antenna, a result of configuring all indices combinable at multiple antennas. Accordingly, in a collection of results of the joint mapping, one element may include a number of timing indices corresponding to a number of antennas.

At operation 1230, the joint path diversity tracking method combines the sample values mapped to the combinable timing positions. In this example, the joint path diversity tracking method combines the sample values mapped to the joint mapped timing positions.

At operation 1240, the joint path diversity tracking method tracks to compensate for a timing error based on the sample values combined in operation 1230. In one example, a tracking process of the communication system is described as follows.

The tracking process of the communication system stores the combined sample values in buffers corresponding to the receiving antennas, and calculates metrics based on the sample values stored in the buffers. The tracking process of the communication system calculates the metrics using an arithmetic average of a preset number of latest sample values stored in the buffers.

Also, the tracking process of the communication system compares the metrics corresponding to the multiple receiving antennas, and compensates for a sampling time error of the sample values corresponding to the multiple receiving antennas based on a result of the comparison. In this example, the tracking process of the communication system compensates for a sampling time error of the sample values corresponding to the multiple receiving antennas by compensating time indices of the sample values based on a result of the comparison of the metrics.

Subsequently, at operation 1250, the joint path diversity tracking method combines the sample values tracked at operation 1240.

Similar to the pre-combining independent path tracking method, the joint path diversity tracking method, according to an embodiment, may be implemented using two schemes, a bi-directional sample window scheme and a unidirectional sample window scheme. The bi-directional sample window scheme is described through FIG. 13, and the unidirectional sample window scheme is described through FIG. 14.

Figure 13:
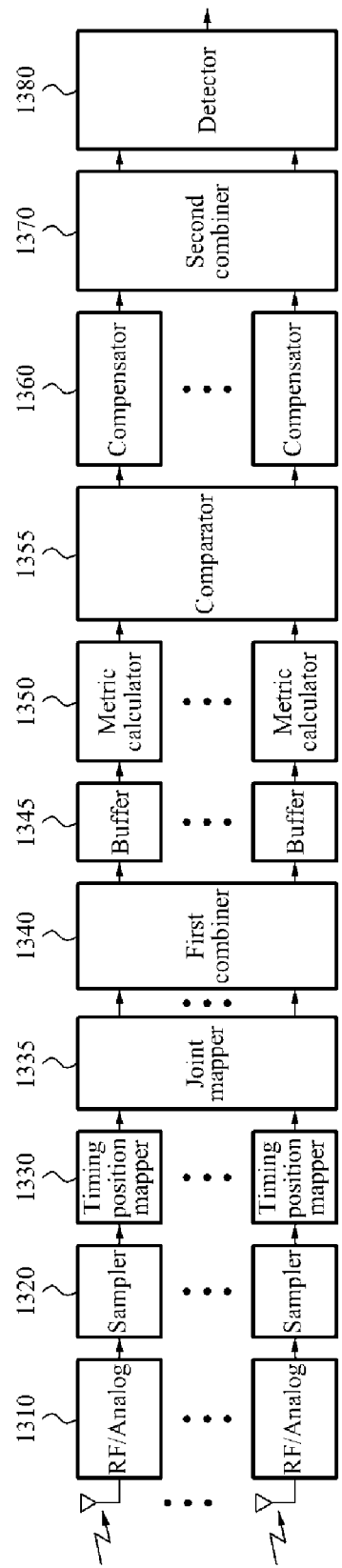
FIG. 13 is a block diagram illustrating the communication system including the multiple receiving antennas to perform a joint path diversity tracking method, according to another embodiment.

FIG. 13 is a block diagram illustrating the communication system including the multiple receiving antennas to perform a joint path diversity tracking method, according to another embodiment.

Referring to FIG. 13, the communication system includes RF/analog circuits 1310, samplers 1320, timing position mappers 1330, a joint mapper 1335, a first combiner 1340, buffers 1345, metric calculators 1350, a comparator 1355, compensators 1360, a second combiner 1370, and a detector 1380. In one example, the RF/analog circuits 1310, the samplers 1320, the first combiner 1340, the second combiner 1370, and the detector 1380 have the same configuration and functionality of the corresponding elements or components of FIG. 11, and reference may be made to the corresponding disclosure. Also, for an operation of the buffers 1345, the metric calculators 1350, the comparator 1355, and the compensators 1360, reference is made to the configuration and functionality of the corresponding elements or components as described in FIG. 5.

Hereinafter, an operation of the communication system according to an embodiment of FIG. 13 is described based on an operation of the timing position mappers 1330 and the joint mapper 1335.

The timing position mappers 1330, according to an embodiment, perform position index mapping to map indices for timing positions of sample values sampled by the samplers 1320. In one example, the timing positions of the sample values correspond to timing positions located in both directions including a position as a reference of ADC sample values at each receiving antenna.

Also, the joint mapper 1335 performs joint mapping a result of mapping of indices by the timing position mappers 1330 to timing positions combinable at all of the receiving antennas.

Subsequently, the first combiner 1340 combines ADC sample values for indices, for example, position indices, that correspond to each join mapping result, that is, combinable timing positions. Combining may be performed for tracking rather than data detection.

Using $x_k^L(i)$, $x_k^C(i)$, $x_k^R(i)$, which is a representation of the ADC sample values, the signal processing is described as follows. In this instance, the communication system may be configured to three oversampling per symbol and include two receiving antennas.

In one example, joint mapping is performed for all antennas after different timing position mapping for each antenna. In a case of two receiving antennas, joint mapping for each antenna may be represented in a form of, for example, a position of a first antenna and a position of a second antenna.

In a case in which three oversampling is performed, joint mapping for each antenna may be represented by (L, L), (L, C), (L, R), (C, L), (C, C), (C, R), (R, L), (R, C), (R, R)

In this example, L denotes a left position, C denotes a center position, and R denotes a right position.

After joint mapping, when results of the joint mapping are simply combined, different nine results may be produced in an i-th transmitting symbol, which may be represented by Equation 2 below. [Equation 2]

$$y^{(L,L)}(i)=x_1^L(i)+x_2^L(i), y^{(L,C)}(i)=x_1^L(i)+x_2^C(i), y^{(L,R)}(i)$$
$$=x_1^L(i)+x_2^R(i),$$

$$y^{(C,L)}(i)=x_1^C(i)+x_2^L(i), y^{(C,C)}(i)=x_1^C(i)+x_2^C(i), y^{(C,R)}(i)$$
$$=x_1^C(i)+x_2^R(i),$$

$$y^{(R,L)}(i)=x_1^R(i)+x_2^L(i), y^{(R,C)}(i)=x_1^R(i)+x_2^C(i), y^{(R,R)}(i)$$
$$=x_1^R(i)+x_2^R(i),$$

In this example, $x_1^L(i)$ denotes a sample value at a left position of an i-th transmitting symbol of a first antenna, and $x_2^L(i)$ denotes a sample value at a left position of an i-th transmitting symbol of a second antenna. Also, $x_2^{(L,L)}(i)$ denotes a value obtained by combining sample values corresponding to a left position of an i-th transmitting symbol of all multiple antennas.

As described in the foregoing, different combination results may be stored in the buffers 1345 of different variables. In this instance, storage in the buffers 1345 of different variables represent storage in buffers corresponding to different timing positions.

The ADC sample values corresponding to multiple symbol periods are stored in the buffers 1345.

Furthermore, the metric calculators 1350 calculate metrics by applying a specific calculation method for each ADC sample value stored in the different buffers 1345.

Similar to the method described in the foregoing, a preset number of latest ADC sample values may be stored in each of the buffers 1345 and metrics may be calculated by applying an arithmetic average of the ADC sample values.

For example, in a case in which two receiving antennas are provided and three oversampling is performed per symbol as shown in FIG. 6, different multiple metrics may be calculated for the combined results as shown in Equation 3 below.

$$\Lambda^{(L,L)}(j) = \frac{1}{N} \sum_{i:i \in S_j, |S_j|=N} y^{(L,L)}(i),$$ [Equation 3]

$$\Lambda^{(L,C)}(j) = \frac{1}{N} \sum_{i:i \in S_j, |S_j|=N} y^{(L,C)}(i),$$

$$\Lambda^{(L,R)}(j) = \frac{1}{N} \sum_{i:i \in S_j, |S_j|=N} y^{(L,R)}(i)$$

$$\Lambda^{(C,L)}(j) = \frac{1}{N} \sum_{i:i \in S_j, |S_j|=N} y^{(C,L)}(i),$$

$$\Lambda^{(C,C)}(j) = \frac{1}{N} \sum_{i:i \in S_j, |S_j|=N} y^{(C,C)}(i),$$

$$\Lambda^{(C,R)}(j) = \frac{1}{N} \sum_{i:i \in S_j, |S_j|=N} y^{(C,R)}(i)$$

$$\Lambda^{(R,L)}(j) = \frac{1}{N} \sum_{i:i \in S_j, |S_j|=N} y^{(R,L)}(i),$$

$$\Lambda^{(R,C)}(j) = \frac{1}{N} \sum_{i:i \in S_j, |S_j|=N} y^{(R,C)}(i),$$

$$\Lambda^{(R,R)}(j) = \frac{1}{N} \sum_{i:i \in S_j, |S_j|=N} y^{(R,R)}(i)$$

$S_j$ denotes a collection of time indices of symbols that may be used in timing tracking by having different values for different positions among N latest symbols as described in the foregoing.

Subsequently, a sampling time error is compensated by adjusting the time indices for the ADC data sample values at each antenna by comparing the metrics. For example, in a case in which a value of $\Lambda^{(R,L)}(j)$ is greatest as a result of a current comparison of the metrics, timing error compensation is performed to set a correct receiving time position of a first antenna to a position immediately later than a center position. In contrast, timing error compensation is performed to set a correct receiving time position of a second antenna to a position immediately before a center position.

A method to compensate the timing error may use a method of duplicating, inserting, or eliminating a sample value as shown in FIG. 9.

After the timing error compensation is performed, the ADC sample values reflecting timing error compensation may be combined at each antenna, and a combined result may be used in data detection. However, in the bi-directional sample window scheme, at least three timing positions at each antenna may be mapped and after joint mapping is performed, at least nine mapping results may be produced. A large buffer size may be required to store such large number of mapping results.

Figure 14:
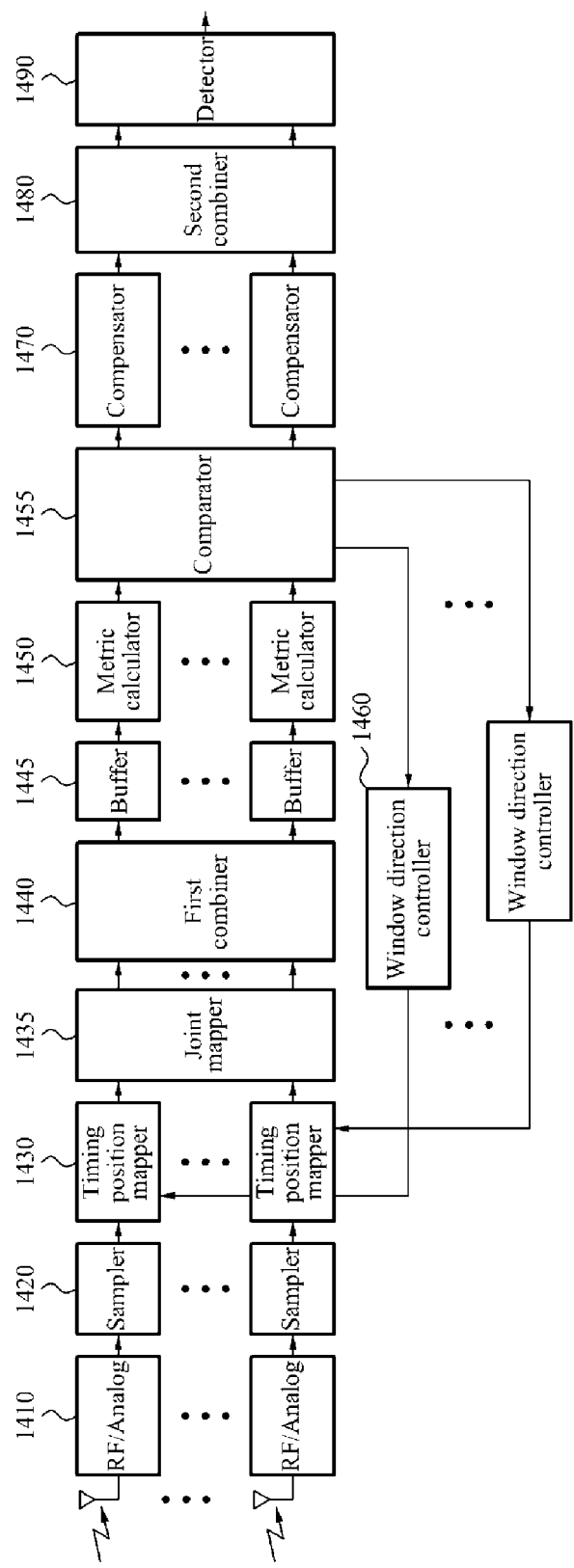
FIG. 14 is a block diagram illustrating the communication system including multiple receiving antennas to perform a joint path diversity tracking method, according to still another embodiment.

Accordingly, in an embodiment, an adaptive unidirectional sample window scheme to reduce an increase in buffer size may be used, and a further detailed description of the communication system is provided through FIG. 14.

FIG. 14 is a block diagram illustrating the communication system including multiple receiving antennas to perform a joint path diversity tracking method, according to still another embodiment.

As described through FIG. 10, the communication system of FIG. 14 includes structural elements similar to those elements described with respect to the communication system of FIG. 13. In accordance with an embodiment, the communication system of FIG. 14 a small memory size of buffers and further includes window direction controllers 1460 to adjust a direction of time indices for sample values stored in buffers.

The window direction controllers 1460 adjust a sample window direction to control a shift direction of time indices of sample values, based on a result of a comparison performed at a comparator 1455, which compares the metric values. Also, the window direction controllers 1460 map sample values to position indices for sample values corresponding to the adjusted positions based on the adjusted sample window direction. That is, the sample window direction adjusted by the window direction controllers 1460 are reflected based on timing position mapping at each antenna.

Also, the window direction controllers 1460 adjust the sample window direction by controlling the shift direction of the time indices of the sample values in a second symbol period with respect to a first sample value sampled at a first position, as a reference of a first symbol period among sample values.

The window direction controllers 1460 perform mapping including a timing position in any one direction from a reference position. In the bi-directional sample window scheme, at least nine mapping results may be produced when joint mapping is performed. In contrast, in the unidirectional sample window scheme, mapping results may be reduced by four.

The method in FIG. 14 may use various methods for the window direction controllers 1460 to set a sample window direction. A method of applying the scheme of Table 1 for each antenna may be cited as an example.

Also, the advanced scheme of Table 2 may be also used. The scheme of Table 2 may be adaptively modified to the joint path diversity tracking as represented by Table 3 below.

TABLE 3

| Sample window direction determined previously | | Timing position determined currently | Sample window direction determined currently |
|---|---|---|---|
| Left | | Left position | Left |
| | Center position | $\Lambda^{(C,C)}(j) - \Lambda^{(L,C)}(j) < \Lambda^{(C,C)}(j-1) - \Lambda^{(L,C)}(j-1)$ for antenna 1 | |
| | | $\Lambda^{(C,C)}(j) - \Lambda^{(C,L)}(j) < \Lambda^{(C,C)}(j-1) - \Lambda^{(C,L)}(j-1)$ for antenna 2 | |
| | | $\Lambda^{(C,C)}(j) - \Lambda^{(L,C)}(j) \geq \Lambda^{(C,C)}(j-1) - \Lambda^{(L,C)}(j-1)$ for antenna 1 | Right |
| | | $\Lambda^{(C,C)}(j) - \Lambda^{(C,L)}(j) \geq \Lambda^{(C,C)}(j-1) - \Lambda^{(C,L)}(j-1)$ for antenna 2 | |
| Right | | Right position | |
| | Center position | $\Lambda^{(C,C)}(j) - \Lambda^{(R,C)}(j) < \Lambda^{(C,C)}(j-1) - \Lambda^{(R,C)}(j-1)$ for antenna 1 | Right |
| | | $\Lambda^{(C,C)}(j) - \Lambda^{(C,R)}(j) < \Lambda^{(C,C)}(j-1) - \Lambda^{(C,R)}(j-1)$ for antenna 2 | |
| | | $\Lambda^{(C,C)}(j) - \Lambda^{(R,C)}(j) \geq \Lambda^{(C,C)}(j-1) - \Lambda^{(R,C)}(j-1)$ for antenna 1 | Left |

TABLE 3-continued

| Sample window direction determined previously | Timing position determined currently | Sample window direction determined currently |
|---|---|---|
| | $\Lambda^{(C,\,C)}(j) - \Lambda^{(C,\,R)}(j) \geq \Lambda^{(C,\,C)}(j-1) - \Lambda^{(C,\,R)}(j-1)$ for antenna 2 | |

As seen in Table 3 above, when a timing position currently determined is a center position, a sample window direction may not be changed to an opposite direction unconditionally. Also, the sample window direction may be changed based on a result value difference.

In one example, the conditional change involves calculating a metric value difference between a center position and a position corresponding to a previous sample window direction. The conditional change also involves adjusting a sample window direction based on an amount of change depending on whether the difference value is increased or decreased over time.

According to an embodiment, the communication systems and methods described above may prevent a timing difference and bit error rate performance degradation due to different characteristics of antennas caused by imperfect characteristics of a plurality of circuit devices when sampling received signals in a low-power communication system.

According to an embodiment, the communication systems and methods described above may perform independent tracking signal processing for each antenna and combine output signals, or may perform tracking after combining a plurality of timing cases combinable at all antennas.

The communication systems and methods described above may efficiently improve data detection performance in a communication system having a frequency-related characteristic difference between receiving antennas, and may enhance reception sensitivity at a receiver.

In particular, in a case of a modulation scheme, such as (PPM) that is known for being suitable for a low-power communication system, reliability in transmission and reception may be dependent on a correct timing position of occurred pulse. Accordingly, the tracking method as described above, according to an embodiment, may be used more efficiently.

Also, application of the tracking method according to an embodiment is not limited to an ultra-low power communication system, such as a super-regenerative receiver. The tracking method, according to an embodiment, may be applied to various communication systems required for dealing with the performance degradation caused by a large timing difference between antennas.

The units described herein may be implemented using hardware components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Program instructions to perform the methods described above, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A tracking method resolving a timing difference caused by different characteristics between antennas, comprising:
sampling signals, at R/F analog circuits, received at the antennas;

tracking sample values resulting from the sampling of the signals; and combining the tracked sample values, wherein the sampling and the tracking are performed independently with respect to each receiving antenna before the tracked sample values are combined, and wherein the tracking comprises storing the sample values in buffers corresponding to the antennas, calculating a metric based on the sample values stored in the buffers, comparing at least two sample values with one another, the at least two sample values corresponding to the metric, and outputting a result indicative thereof, and compensating for the sampling time error of the sample values based on the result.

2. The tracking method of claim 1, wherein the tracking comprises individually tracking the sample values resulting from the sampling of the signals received at the antennas.

3. The tracking method of claim 1, wherein the calculating of the metric comprises calculating the metric using an arithmetic average of a preset number of latest sample values stored in the buffers.

4. The tracking method of claim 1, wherein the calculating of the metric comprises calculating the metric at a respective position of a symbol period corresponding to the antennas.

5. The tracking method of claim 1, wherein the compensating of the sampling time error of the sample values comprises individually compensating for the sampling time error of the antennas.

6. The tracking method of claim 1, wherein the compensating of the sampling time error of the sample values comprises compensating for the sampling time error by adjusting time indices of the sample values based on the result.

7. The tracking method of claim 6, wherein the compensating of the sampling time error of the sample values comprises in response to the result of a first sample value, corresponding to an antenna of the antennas, sampled at a first position, and being a reference of a first symbol period, and a third sample value, which is sampled immediately after the first symbol period, being less than a second sample value, which is immediately sampled prior to the first symbol period, compensating for the sampling time error of the sample values by compensating for the time indices by inserting a sample value in a second symbol period after the first symbol period.

8. The tracking method of claim 7, wherein the storing of the sample values comprises adjusting a sample window direction to control a shift direction of the time indices of the sample values based on the result, and storing, in the buffers, sample values corresponding to a compensated position based on the adjusted sample window direction.

9. The tracking method of claim 8, wherein the adjusting of the sample window direction comprises adjusting the sample window direction by controlling a shift direction of time indices for sample values of the second symbol period with respect to the first sample value sampled at the first position, as a reference of the first symbol period, among the sample values stored in the buffers.

10. The tracking method of claim 6, wherein the compensating of the sampling time error of the sample values comprises in response to the result of a first sample value, corresponding to an antenna of the antennas, sampled at a first position, and being a reference of a first symbol period, and a second sample value, which is sampled immediately prior to the first symbol period, being less than a third sample value, which is immediately sampled after the first symbol period, compensating for the sampling time error of the sample values by compensating for the time indices by eliminating a sample value from a second symbol period after the first symbol period.

11. A non-transitory computer-readable medium comprising a program for instructing a computer to perform the method of claim 1.

12. A tracking method resolving a timing difference caused by different characteristics between antennas, comprising:

sampling signals, at RF/analog circuits received at the antennas;

mapping sample values resulting from the sampling of the signals to timing positions;

combining the sample values mapped to the timing positions;

tracking the combined sample values; and combining the tracked sample values, wherein the sampling and the tracking are performed independently with respect to each receiving antenna before the tracked sample values are combined, wherein the mapping comprises:

mapping position indices corresponding to the timing positions of the sample values; and joint mapping of the mapping of the position indices and the timing positions.

13. The tracking method of claim 12, wherein the combining of the sample values comprises combining the sample values mapped to the joint mapped timing positions.

14. The tracking method of claim 12, further comprising:

storing the combined sample values in buffers corresponding to the receiving antennas, calculating a metric based on the sample values stored in the buffers, comparing at least two sample values with one another, the at least two sample values corresponding to the metric, and outputting a result indicative thereof, and compensating for a sampling time error of the sample values based on the result.

15. The tracking method of claim 14, wherein the calculating of the metric comprises calculating the metric using an arithmetic average of a preset number of latest sample values stored in the buffers.

16. The tracking method of claim 14, wherein the compensating of the sampling time error of the sample values comprises compensating for time indices of the sample values based on the result.

17. The tracking method of claim 16, wherein the compensating of the sampling time error of the sample values comprises in response to the result of a first sample value, corresponding to an antenna of the antennas, sampled at a first position, and being a reference of a first symbol period, and a third sample value, which is sampled immediately after the first symbol period, being less than a second sample value, which is immediately sampled prior to the first symbol period, compensating for the sampling time error of the sample values by compensating for the time indices by inserting a sample value in a second symbol period after the first symbol period.

18. The tracking method of claim 17, wherein the mapping of the position indices comprises:
adjusting a sample window direction to control a shift direction of the time indices of the sample values based on the result; and
mapping, to the sample values resulting from the sampling, the position indices corresponding to timing positions of sample values corresponding to a compensated position based on the adjusted sample window direction.

19. The tracking method of claim 18, wherein the adjusting of the sample window direction comprises adjusting the sample window direction by controlling a shift direction of time indices for sample values of the second symbol period with respect to the first sample value sampled at the first position as a reference of the first symbol period, among the sample values.

20. The tracking method of claim 19, wherein the compensating of the sampling time error of the sample values comprises
in response to the result of a first sample value, corresponding to an antenna of the antennas, sampled at a first position, and being a reference of a first symbol period, and a second sample value, which is sampled immediately prior to the first symbol period, being less than a third sample value, which is immediately sampled after the first symbol period,
compensating for the sampling time error of the sample values by compensating for the time indices by eliminating a sample value from a second symbol period after the first symbol period.

21. The tracking method of claim 20, wherein the mapping of the position indices comprises:
adjusting a sample window direction to control a shift direction of the time indices of the sample values based on the result; and
mapping, to the sample values resulting from the sampling, the position indices corresponding to timing positions of sample values corresponding to a compensated position based on the adjusted sample window direction.

22. The tracking method of claim 21, wherein the adjusting of the sample window direction comprises adjusting the sample window direction by controlling a shift direction of time indices for sample values of the second symbol period with respect to the first sample value sampled at the first position as a reference of the first symbol period, among the sample values.

* * * * *